(12) United States Patent
Scheri

(10) Patent No.: US 10,502,219 B2
(45) Date of Patent: Dec. 10, 2019

(54) SUPERCHARGING DEVICE FOR A COMBUSTION ENGINE

(71) Applicant: BorgWarner Inc., Auburn Hills, MI (US)

(72) Inventor: Alessio Scheri, Mainz (DE)

(73) Assignee: BorgWarner Inc., Auburn Hills, MI (US)

( * ) Notice: Subject to any disclaimer, the term of this patent is extended or adjusted under 35 U.S.C. 154(b) by 621 days.

(21) Appl. No.: 15/038,751

(22) PCT Filed: Nov. 19, 2014

(86) PCT No.: PCT/US2014/066475
§ 371 (c)(1),
(2) Date: May 24, 2016

(87) PCT Pub. No.: WO2015/080921
PCT Pub. Date: Jun. 4, 2015

(65) Prior Publication Data
US 2017/0030365 A1 Feb. 2, 2017

(30) Foreign Application Priority Data

Nov. 29, 2013 (DE) ........................ 10 2013 224 529

(51) Int. Cl.
*F04D 27/00* (2006.01)
*F02B 37/16* (2006.01)
(Continued)

(52) U.S. Cl.
CPC ............ *F04D 27/009* (2013.01); *F02B 33/40* (2013.01); *F02B 37/013* (2013.01);
(Continued)

(58) Field of Classification Search
CPC .. F04D 15/0011; F04D 15/0005; F04D 17/10; F04D 17/165; F04D 25/06;
(Continued)

(56) References Cited

U.S. PATENT DOCUMENTS 4,373,336 A 2/1983 Hoerler et al.
6,129,524 A 10/2000 Woollenweber et al.
(Continued)

FOREIGN PATENT DOCUMENTS

| DE | 1079954 B | * 4/1960 | .......... F04D 15/0011 |
|---|---|---|---|
| JP | 04209992 A | 7/1992 | |
| WO | 2004031556 A1 | 4/2004 | |

OTHER PUBLICATIONS

Translation of DE 1079954 B generated by Espacenet.com, Martin Pekrun, Apr. 1960.*

(Continued)

*Primary Examiner* — Dwayne J White
*Assistant Examiner* — Danielle M. Christensen
(74) *Attorney, Agent, or Firm* — Eric L. Doyle; Stephan A. Pendorf; Patent Central LLC

(57) ABSTRACT

A supercharging device (20), having: a housing (21) which has a longitudinal axis (L); at least one housing inlet (1) which leads into the housing (21); at least one housing outlet (2) which leads out of the housing (21); at least one compressor wheel (5) which is arranged in a compressor chamber (15) and which is driven by a motor shaft (16) and which is arranged between the housing inlet (1) and the housing outlet (2) of the housing (21) as viewed in the flow direction, and at least one bypass duct (17) which is integrated in the housing (21) and which connects the housing inlet (1) to the housing outlet (2) so as to bypass the compressor chamber (15). The bypass duct (17) has a self-adjusting valve (22). The housing inlet (1) and the
(Continued)

housing outlet (2) are formed as an axial inlet and an axial outlet respectively.

11 Claims, 3 Drawing Sheets

(51) Int. Cl.
    *F02B 33/40*     (2006.01)
    *F02B 37/013*     (2006.01)
    *F02B 39/10*     (2006.01)
    *F04D 29/42*     (2006.01)
    *F02B 37/00*     (2006.01)
    *F04D 17/10*     (2006.01)

(52) U.S. Cl.
    CPC ............ *F02B 37/162* (2019.05); *F02B 39/10* (2013.01); *F04D 29/4253* (2013.01); *F02B 37/004* (2013.01); *F04D 17/10* (2013.01); *Y02T 10/144* (2013.01)

(58) Field of Classification Search
    CPC .. F04D 25/062; F04D 27/009; F04D 29/4253; F02B 37/127; F02B 33/40
    See application file for complete search history.

(56) References Cited

U.S. PATENT DOCUMENTS

| | | | |
|---|---|---|---|
| 7,588,047 B2 | 9/2009 | Vogt | |
| 8,844,283 B2* | 9/2014 | Kuhlmeyer | F02B 37/183 137/498 |
| 2013/0186085 A1* | 7/2013 | Kuhlmeyer | F02B 37/183 60/602 |

OTHER PUBLICATIONS

International Search Report and Written Opinion in International Application No. PCT/US2014/066475 dated Mar. 19, 2015.

\* cited by examiner

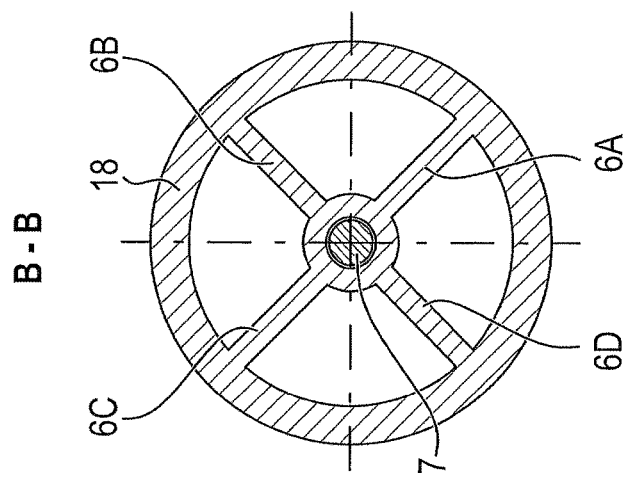
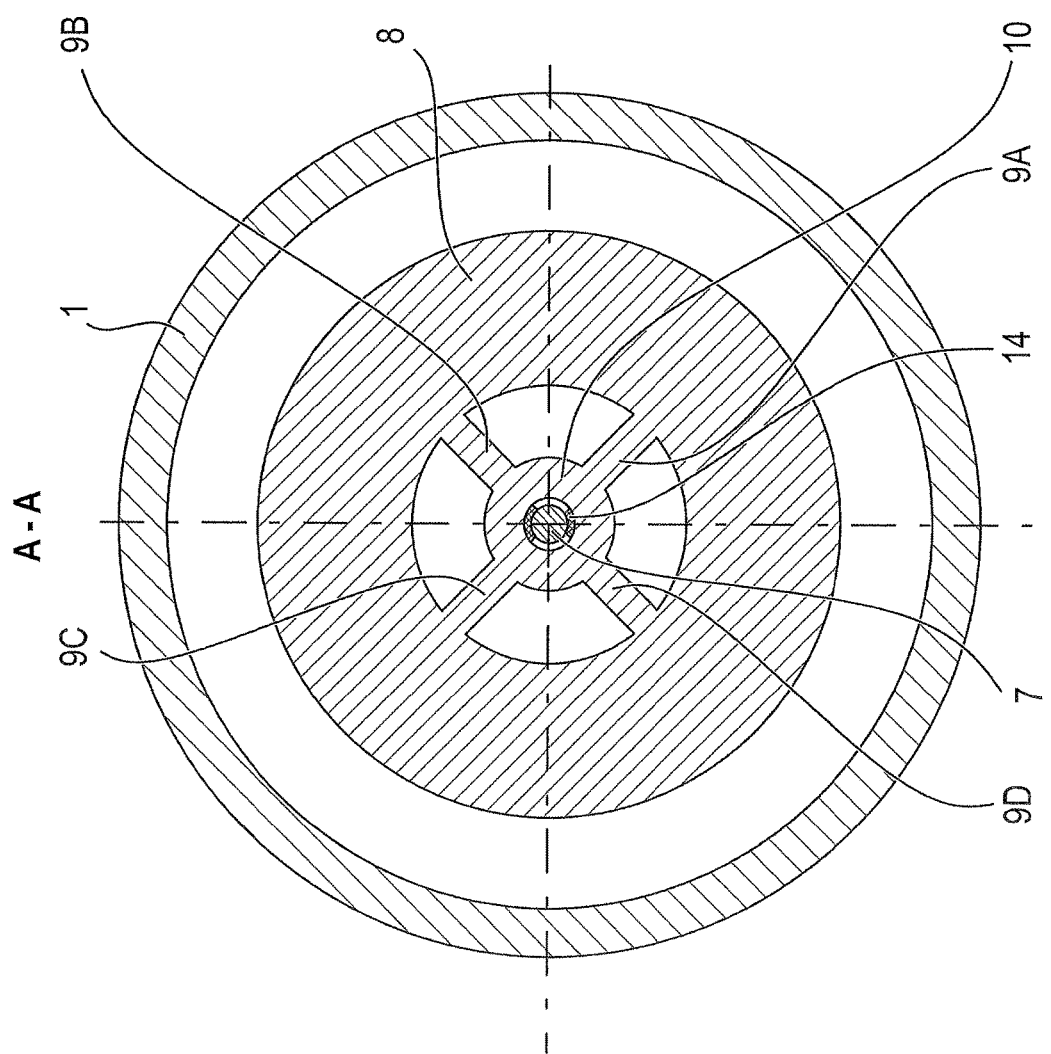

SUPERCHARGING DEVICE FOR A COMBUSTION ENGINE

BACKGROUND OF THE INVENTION

Field of the Invention

The invention relates to a supercharging device for a combustion engine as claimed in the preamble of claim 1.

Description of the Related Art

A supercharging device of this type is known from EP 1 546 524 B1. If the radial compressor known from said document is used in multi-stage systems, space problems arise owing to the geometric configuration of such radial compressors.

It is therefore an object of the present invention to provide a supercharging device for a combustion engine of the type indicated in the preamble of claim 1 which makes it possible to realize a lightweight and compact system.

BRIEF SUMMARY OF THE INVENTION

This object is achieved by the features of claim 1.

According to the invention, a supercharging device is accordingly created which is suitable in particular for the high-pressure stage of a two-stage supercharging arrangement and which realizes, in a single arrangement, a main line and a shut-off element, in particular in the form of a valve, arranged in said main line.

In said arrangement, the flow, which in the case of known multi-stage supercharging arrangements is normally conducted around the high-pressure stage, is conducted around the high-pressure compressor in an annular duct. Here, the preferably axially movable valve or shut-off element performs the task of sealing off the annular duct when the high-pressure stage is active.

The valve may be in the form of a passive valve, which means that it operates without an external actuator. The opening characteristic is based on the pressure distribution on the surfaces of the valve.

The dependent claims contain advantageous developments of the invention.

BRIEF DESCRIPTION OF THE SEVERAL VIEWS OF THE DRAWINGS

Further details, advantages and features of the present invention become apparent from the following description of an embodiment with reference to the drawing, in which:

FIG. 2 shows a sectional illustration of the supercharging device along the line A-A in FIG. 1, FIG. 3 shows a sectional illustration of the supercharging device along the line B-B in FIG. 1.

DETAILED DESCRIPTION OF THE INVENTION

Figure 1:
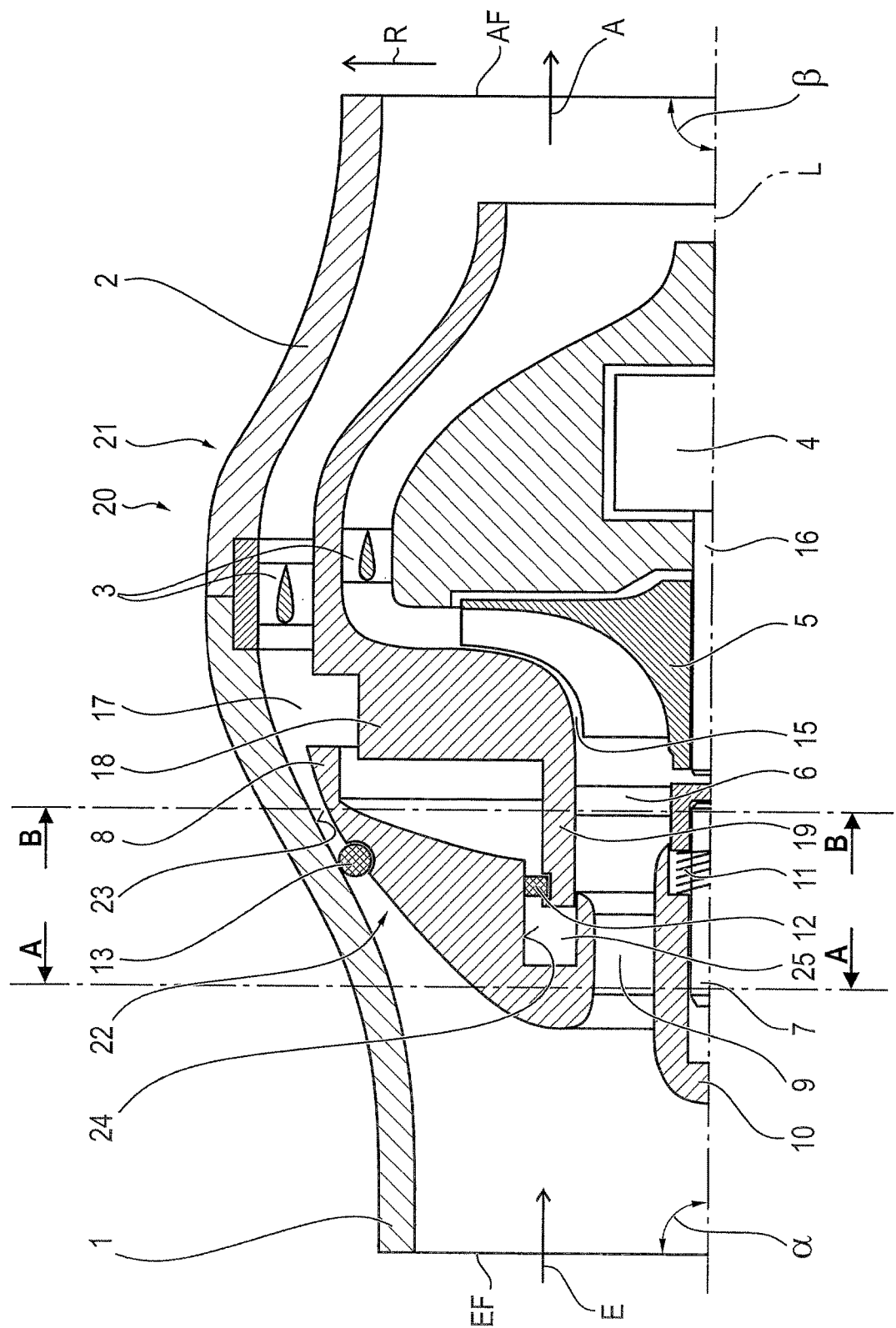
FIG. 1 shows a longitudinal section through a supercharging device according to the invention.

FIG. 1 shows a longitudinal section through a supercharging device 20 according to the invention, wherein the illustration shows only the half of the supercharging device 20 arranged above the longitudinal central line L.

The supercharging device 20 has a housing 21 which comprises a housing inlet 1 and a housing outlet 2. In the housing 21 there is arranged a compressor housing 18 in which a compressor chamber 15 is provided, in which compressor chamber a compressor wheel 5 is arranged. As shown in FIG. 1, the compressor wheel 5 is arranged between the housing inlet or air inlet 1 and the housing outlet or air outlet 2 as viewed in the flow direction.

The compressor wheel 5 is fastened to a motor shaft 16 of an electric motor 4, which may be equipped with a power source (not illustrated in FIG. 1) and a suitable control device (likewise not illustrated in FIG. 1).

As indicated in FIG. 1, the housing 21 is formed out of the housing inlet 1 and the housing outlet 2, which are both of tubular form. The shape of said two components can be adapted to the respective usage and installation situation. This likewise applies to the inner contour of the housing 21, which is additionally influenced by the outer contour of the compressor housing 18 and of a valve 22 which will be described in detail below.

The inner system formed from the compressor housing 18 and the component installed therein is guided in the housing 21 by way of a set of radial fins 3, which may be of streamlined form and which may moreover perform the function of a diffuser.

As FIG. 1 also shows, the housing inlet 1 and the housing outlet 2 are each formed as an axial inlet, which means that the inlet surface EF of the housing inlet 1 is oriented at least substantially at a right angle with respect to the longitudinal axis or longitudinal central line of the housing 21. In the ideal situation, the value of the angle is exactly 90°.

Accordingly, the outlet surface AF of the housing outlet 2 is oriented at an angle □ with respect to the longitudinal axis L, said angle □ likewise being at least substantially a right angle and, in the ideal situation, exactly a right angle.

The valve 22 serves for opening and closing a bypass duct 17 that is integrated in the housing 21. As shown in FIG. 1, the bypass duct 17 is connected to the housing inlet or inlet duct 1 and to the housing outlet or outlet duct 2 so as to bypass the compressor chamber 15. As shown in FIG. 1, the geometry of the bypass duct 17 is dependent on the inner and outer contours of the housing 21 and of the valve 22 and also of the compressor housing 18, and can be adapted to the respective usage and installation situation.

The valve 22 has a valve body 8 which is guided movably along the longitudinal axis L and which is preloaded by a spring 11 into the closed position shown in FIG. 1, in which the bypass duct 17 is closed.

For this purpose, the valve body 8 is arranged on a guide 19 which is an axially projecting region, or a region which projects in the longitudinal direction L, of the compressor housing 18.

The valve body 8 has a valve body seal 13 which, in the closed position illustrated in FIG. 1, serves for sealing off the bypass duct 17 and, for this purpose, bears against an inner wall surface region 23 of the housing 21.

Furthermore, a valve guide seal. 12 is provided which is arranged on the guide 19 and which bears against an inner wall 24 of a guide recess 25 of the valve body 8.

As can be seen from a juxtaposition of FIGS. 1 and 2, the valve body 8 is guided on a foot part 10 by way of a first fin arrangement 9A, 9B, 9C, 9D extending in a radial direction R. The foot part 10 is in turn mounted, preferably by way of a bushing or plain bearing bushing 14, on a guide pin 7 which can also be seen in FIG. 3 and which, together with a compressor housing fin arrangment 6A to 6D extending in the radial direction R, forms a holding means which fixes the compressor housing 18 in the housing 21.

The fins 6A to 6D may be in the form of vanes which are either formed integrally with, or fixed to, the compressor housing 18. The vanes 6A to 6D may be designed so as to generate or reduce turbulence in a fluid flow to the compressor wheel 5.

The foot 10 of the valve 22 is arranged in slidingly movable fashion on the guide pin, wherein the plain bearing bushing 14 serves for reducing friction. One or more ducts may be provided radially or axially in the region between the pin 7 and the foot 10 in order to be able to compensate pressure fluctuations in the corresponding volume. The spring 11 acts between the foot 10 and the holding means 6, 7 and closes the valve 22, as shown in FIG. 1.

Arranged on the foot 10 is the second vane arrangement 9A to 9D, which holds the valve body 8. The characteristics of the valve 22 with regard to pressure losses and flow splitting behavior can be influenced by means of the shape of said valve body 8.

The seals 12 and 13 may preferably be in the form of O-rings and, aside from the positions shown in FIG. 1, may also be provided at other suitable locations depending on design and usage situation. The seals are designed to withstand pressure differences between the pressure and suction sides of the compressor 4, 5, 16 during the operation thereof.

Figure 4:
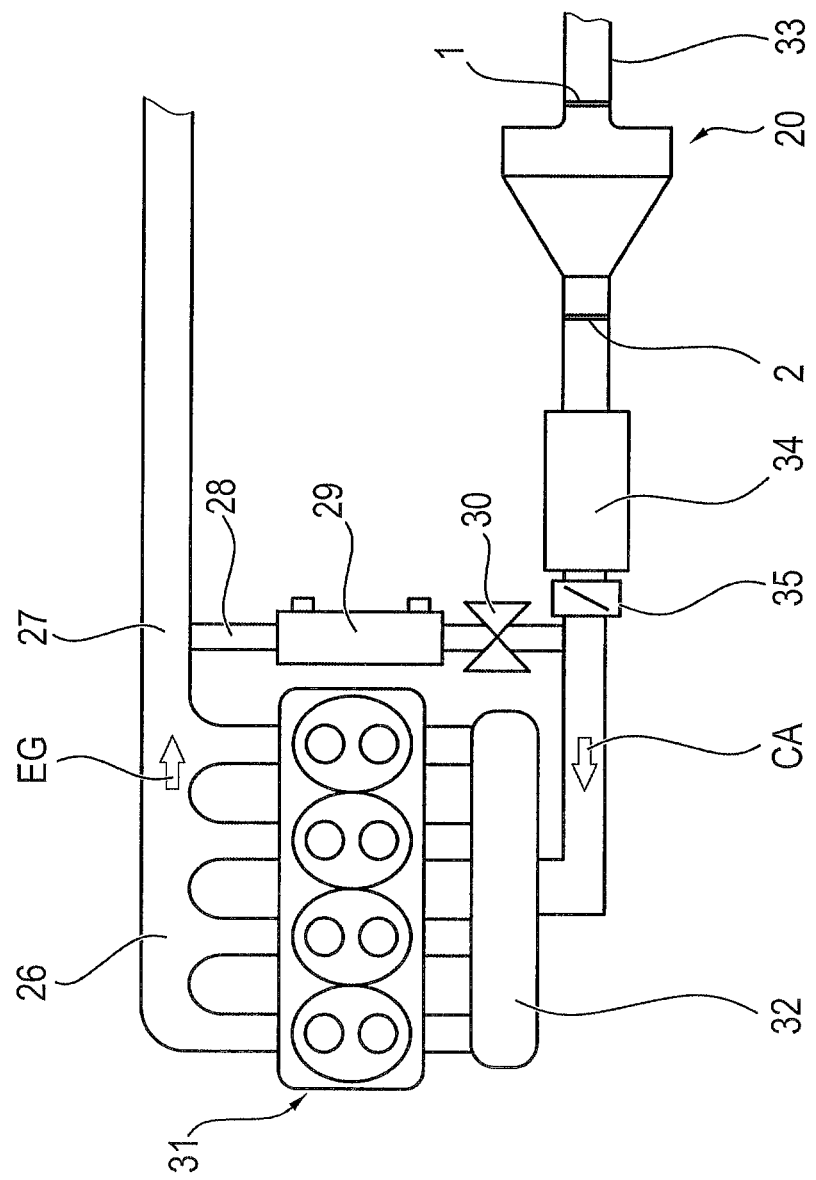
FIG. 4 shows a schematic illustration of a combustion engine equipped with a supercharging device.

FIG. 4 is a schematically highly simplified illustration of a combustion engine 31, for example in the form of an internal combustion engine (diesel or Otto-cycle engine). The combustion engine 31 has an intake line 33 in which the compressor, with its motor 4, the motor shaft 16 and the compressor wheel 5, is arranged as illustrated in FIG. 1. A charge-air cooler 34, followed by a throttle 35, may be arranged downstream of the compressor in the intake line 33 in which the supercharging device 20 may be arranged. The compressed air, which is symbolized by the arrow CA, from the compressor is supplied to an intake manifold 32, and the cylinders of the combustion engine 31 are supplied with the compressed air from said intake manifold.

The exhaust gas EG is supplied to an exhaust line 27 via an exhaust manifold 26.

In the preferred embodiment which is illustrated in FIG. 4, the internal combustion engine 31 is also provided with an exhaust-gas recirculation line 28 in which an exhaust-gas cooler 29 and a valve 30 are arranged. However, said exhaust-gas recirculation line 28, together with its components 29 and 30, is not mandatory, but rather constitutes merely a particularly preferred embodiment.

As has already been explained in the introduction, the supercharging device 20 is furthermore particularly suitable for a two-stage engine supercharging arrangement with a high-pressure stage and a low-pressure stage. In addition to the above written disclosure of the invention, reference is hereby explicitly made, for supplementary disclosure thereof, to the diagrammatic illustration of the invention in FIGS. 1 to 4.

LIST OF REFERENCE SYMBOLS

1 Housing inlet/housing inlet line
2 Housing outlet/housing outlet line
3 Radial fins
4 Electric motor
5 Compressor wheel
6,7 Holding means (6A to 6D fins; 7: pin)
8 Movable valve body
9A to 9D Vanes
10 Valve foot
11 Spring
12 Seal/O-ring
13 Seal/O-ring
14 Bushing/plain bearing bushing
15 Compressor chamber
16 Shaft
17 Bypass duct
18 Compressor housing
19 Guide
20 Supercharging device
21 Housing
22 Valve/shut-off element
23 Inner wall surface region
24 Inner wall
25 Guide recess
26 Exhaust manifold
27 Exhaust line
28 Exhaust-gas recirculation line
29 Exhaust-gas cooler
30 Valve
31 Combustion engine
32 Intake manifold
33 Intake line
34 Charge-air cooler
35 Throttle
, □ Angles
CA Compressed air
EG Exhaust gas
L Longitudinal axis/longitudinal central line

The invention claimed is:

1. A supercharging device (20), having
a supercharger housing (21) which has a longitudinal axis (L);
at least one supercharger housing inlet (1) which leads into the supercharger housing (21);
at least one supercharger housing outlet (2) which leads out of the supercharger housing (21);
at least one compressor wheel (5) which is arranged in a compressor chamber (15) in a compressor housing (18) and which is driven by a motor shaft (16) and which is arranged between the supercharger housing inlet (1) and the supercharger housing outlet (2) of the supercharger housing (21) as viewed in the flow direction, and
an annular bypass duct (17) which is integrated in the supercharger housing (21) and surrounds the compressor housing (18) and which connects the supercharger housing inlet (1) to the supercharger housing outlet (2) so as to bypass the compressor chamber (15), the bypass duct (17) having a valve (22), wherein
the supercharger housing inlet (1) and the supercharger housing outlet (2) are formed as an axial inlet and an axial outlet respectively, and
a guide pin (7) is provided which is fixed to the compressor housing (18) by way of a compressor housing fin arrangement (6A to 6D).

2. The supercharging device as claimed in claim 1, wherein the valve (22) has a valve body (8) which is guided movably along the longitudinal axis (L) and which is preloaded into a closed position by a spring (11).

3. The supercharging device as claimed in claim 2, wherein the valve body (8) is arranged on a guide (19) which is part of the compressor housing (18) which is arranged in the supercharger housing (21).

4. The supercharging device as claimed in claim 2, wherein the valve body (8) has a valve body seal (13) which, in the closed position of the bypass duct (17), bears against an inner wall surface region (23) of the supercharger housing (21).

5. The supercharging device as claimed in claim 2, wherein the valve body (8) is arranged, by way of a foot fin arrangement (9A to 9D) running in a radial direction (R), on a foot part (10) of the valve (22).

6. The supercharging device as claimed in claim 1, wherein the valve body (8) is arranged, by way of a foot fin arrangement (9A to 9D) running in a radial direction (R), on a foot part (10) of the valve (22), and wherein the foot part (10) is guided in slidingly movable fashion on the guide pin (7).

7. The supercharging device as claimed in claim 1, wherein the valve body (8) is arranged, by way of a foot fin arrangement (9A to 9D) running in a radial direction (R), on a foot part (10) of the valve (22), and wherein the foot part (10) is guided on the guide pin (7) by way of a bushing (14).

8. The supercharging device as claimed in claim 1, wherein the compressor wheel (5) is connected in terms of drive via the motor shaft (16) to an electric motor.

9. The supercharging device as claimed in claim 1, wherein the valve (22) is a self-adjusting valve.

10. The supercharging device as claimed in claim 1, wherein the valve (22) is an active valve.

11. A supercharging device (20), having a supercharger housing (21) which has a longitudinal axis (L);
    at least one supercharger housing inlet (1) which leads into the supercharger housing (21);
    at least one supercharger housing outlet (2) which leads out of the supercharger housing (21);
    at least one compressor wheel (5) which is arranged in a compressor chamber (15) and which is driven by a motor shaft (16) and which is arranged between the supercharger housing inlet (1) and the supercharger housing outlet (2) of the supercharger housing (21) as viewed in the flow direction, and
    at least one bypass duct (17) which is integrated in the supercharger housing (21) and which connects the supercharger housing inlet (1) to the supercharger housing outlet (2) so as to bypass the compressor chamber (15), the bypass duct (17) having a valve (22), wherein
    the supercharger housing inlet (1) and the supercharger housing outlet (2) are formed as an axial inlet and an axial outlet respectively,
    the valve (22) has a valve body (8) which is guided movably along the longitudinal axis (L) and which is preloaded into a closed position by a spring (11),
    the valve body (8) is arranged on a guide (19) which is part of a compressor housing (18) which is arranged in the supercharger housing (21), and
    a valve guide seal (12) is provided which is arranged on the guide (19) and which bears against an inner wall (24) of a guide recess (25) of the valve body (8).

* * * * *